INVENTOR.
GERRIT KOOL
BY
Frank R. Trifari
AGENT

INVENTOR.
GERRIT KOOL
BY
Frank R. Jifari
AGENT

May 27, 1969 G. KOOL 3,447,025

CIRCUIT ARRANGEMENT FOR USE IN A TELEVISION RECEIVER FOR DYNAMIC RADIAL CONVERGENCE IN RHYTHM OF THE FIELD FREQUENCY

Filed Feb. 16, 1967

INVENTOR.
GERRIT KOOL
BY
Frank R. Jifari
AGENT

United States Patent Office 3,447,025

Patented May 27, 1969

3,447,025

CIRCUIT ARRANGEMENT FOR USE IN A TELEVISION RECEIVER FOR DYNAMIC RADIAL CONVERGENCE IN RHYTHM OF THE FIELD FREQUENCY

Gerrit Kool, Emmasingel, Eindhoven, Netherlands, assignor, by mesne assignments, to U.S. Philips Corporation, a corporation of Delaware Filed Feb. 16, 1967, Ser. No. 616,738

Claims priority, application Netherlands, Feb. 19, 1966, 6602181

Int. Cl. H01j 29/50

U.S. Cl. 315—13 8 Claims

ABSTRACT OF THE DISCLOSURE

A vertical dynamic convergence circuit for use with a color television deflection system. The circuit includes a source of parabolic current and means for simultaneously varying the parabolic current flowing in two of the convergence coils. The circuit further includes a single source of sawtooth current in combination with a novel matrix arrangement which operates to simultaneously vary the relative amplitudes of the sawtooth currents flowing in said two convergence coils either in the same or opposite sense.

The invention relates to a circuit arrangement for use in a television receiver for the dynamic, radial convergence of at least two electron beams of a display tube in the rhythm of the field frequency. The novel arrangement comprises at least two convergence coils for affecting each one electron beam, a first source of a parabolic current, means for varying this parabolic current in common through the two convergence coils, a second source of a sawtooth current, and means for varying this sawtooth current in common through the two convergence coils.

An arrangement of this type is described in U.S. Patent 3,114,858. From this patent it appears to be possible to pass, apart from the desired parabolic current, a sawtooth current through the two convergence coils. The adjusting means are capable of varying the amplitude of the field-frequency parabolic current as a whole and the amplitude of the parabolic current through one convergence coil with respect to that of the other convergence coil.

In this known arrangement the field-frequency sawtooth current can be varied so that both the amplitude and the polarity can be changed by the adjusting means. The sawtooth currents passing through the two convergence coils can, furthermore, be varied in opposite senses. The latter is achieved by providing said arrangement with two sources suppling a sawtooth voltage. These sources are two separate secondary windings of the field output transformer, included in the output circuit of the field output amplifier. The field deflection coils are magnetically coupled with said transformer. In order to dervie the sawtooth component for the deflection coils and for the dynamic field convergence with a minimum of distortion from said secondary windings, the load networks formed by the inductors and resistors for these secondary windings must be adapted in a precise manner. Otherwise, said sawtooth currents are distorted so that the currents intended for correction themselves introduce new errors. The use of said double source for the supply of correction currents of the same type (sawtooth components) increases the risk of new errors in this highly critical convergence circuit.

The principle of the invention tends to use only one source for the supply of the sawtooth components for the field convergence circuitry. As a matter of course, means have to be provided for varying the sawtooth current through the two convergence coils simultaneously either in the same sense or in opposite senses.

For this purpose the circuit arrangement according to the invention is characterized in that only one common source is used for supplying the sawtooth current, in that the means for varying the sawtooth current comprise two parallel-connected resistors provided each with a variable tapping, said tappings being mechanically coupled with each other so that they shift in relatively opposite senses along the relevant resistors upon the actuation of the associated adjusting member. The circuit further comprises a third resistor provided with a variable tapping and connected between the first-mentioned two tappings and in parallel with the sawtooth current source. The first convergence coil, the parallel-connected resistors and the second convergence coil are connected in series, in said order of succession, and the other ends of the coils are interconnected with the interposition of at least one fourth resistor. The variable tapping of the third resistor is connected to a fixed central tapping of the fourth resistor, to which the variable parabolic voltage is applied.

It should be noted that, in principle, for the radial convergence, only the direction of the sawtooth current need be reversible. This may be accounted for as follows. For example, with a three-gun shadow-mask tube the potential color errors in the deflection of the three electron beams are due, inter alia to the fact that during the deflection the three rays do not coincide anywhere on the screen. A first cause is that the radius of curvature of said mask located directly in front of the flat screen of the display tube is greater than the radius of curvature of the image plane determined by the deflection coils. If, by static convergence, the three rays coincide at the center of the mask, coincidence is not obtained towards the edges. In view of the spherical shape of said image plane, the current required for correcting this error must have a quadratic function or be parabolic (see, for example, Telefunken Zeitung, vol. 1, annum 38, 1965, pages 87 and 88). Since the radius of curvature of the image plane is smaller that that of the mask, the direction of the parabolic current is fixed with a chosen sense of winding of the convergence coils.

Due to deviation from the oblique positions of the guns with respect to each other, tolerance of the deflection coils, and so on, it may furthermore be necessary to correct the errors involved by displacements. This displacement is obtained by means of said sawtooth current, since, with respect to the center of the period of the vertical stroke, it reduces the parabolic current on one side of said center and increases it on the other side. Since the latter errors depend upon random structural defects, it cannot be predicted which phase or amplitude of the sawtooth current is required. It is, moreover, desirable that two of the three electron beams be adjustable in common (this simplifies the adjusting manipulations). The adjustment has to permit for at least two electron beams to vary the sawtooth components in common in the same sense and/or in the opposite sense.

In practice it appears that in accordance with the nature of the deflection coils employed, corrections are required in a vertical direction so that the point of coincidence of two of the three electron beams on the mask, obtained by said convergence correction, is located either above or below the point of impact of the third electron beam on the mask without convergence correction. This means that the direction of the field-frequency parabolic current through two of the three convergence coils (usually the coils associated with the red and green electron beams)

need not be reversible, whereas that passing through the third convergence coil (the coil associated with the blue electron beam) must be reversible.

According to a further aspect of the invention, the circuit arrangement includes a fifth resistor connected in parallel with the fourth resistor. The fifth resistor is provided with a variable tapping which is connected to the central tapping of the fourth resistor. The fourth and the fifth resistors are connected in parallel with the first source of parabolic voltage. One end of the third coil is connected to a variable tapping on the fourth resistor, and the other end to a variable tapping on a sixth resistor, which is connected in parallel with the third resistor.

It should be noted that the presence of the adjusting means for reversing the direction of the sawtooth current through two (red and green) of the three convergence coils provides a fairly simple possibility of completing the adjusting means so that also the direction of the parabolic current through the third coil can be reversed. Moreover, the means for reversing the direction of the sawtooth current through the third (blue) convergence coil permit of correcting an error, if any, produced by the adjusting means for the sawtooth current through the first two coils. As far as the convergence of two electron beams is concerned, the above also applies to a two-gun display tube employed in a dichrome system or stereoscopic display. Also in this case it is required that the two beams be dynamically converged during the deflection.

A few possible embodiments of the circuit arrangement according to the invention will be described with reference to the accompanying figures.

Figures 1, 2:
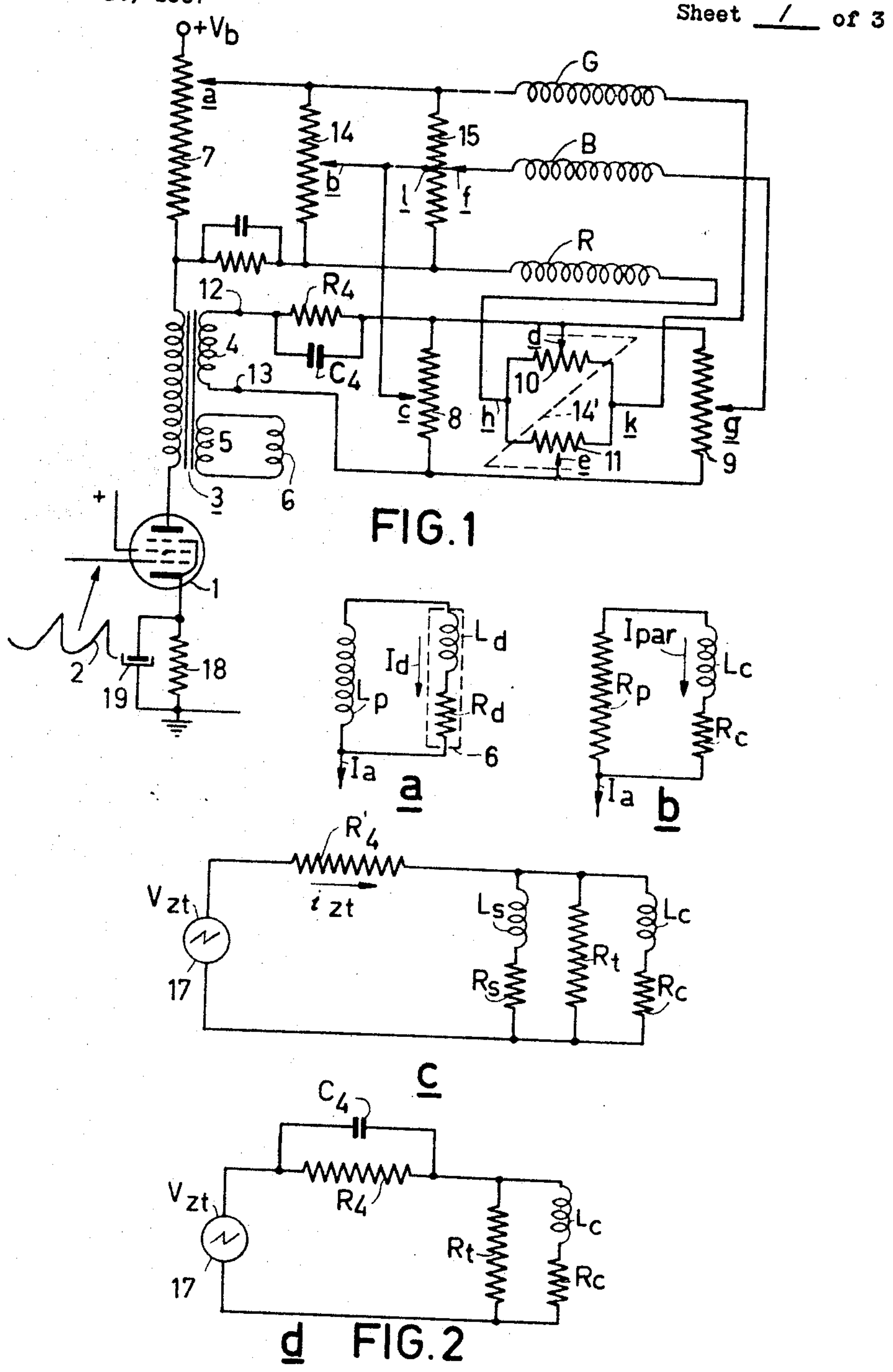
FIG. 1 shows the circuit arrangement proper.
FIG. 2 shows a partial substitute diagram of the arrangement of FIG. 1 for explaining the adaptation of the various networks to the sources.

Referring to FIG. 1, reference numeral 1 designates the field output tube, to whose control-grid is applied a control-signal 2 at the vertical deflection frequency. As is known, this control-signal comprises at least one sawtooth component and one parabolic component. The anode current of the tube 1 will therefore also have a sawtooth component and a parabolic component.

The anode circuit of the tube 1 includes an output transformer 3 having two secondary windings 4 and 5. The secondary winding 5 has connected to it the deflection coils 6, surrounding the neck of the display tube (not shown) and providing the vertical deflection of the electron beams. The control by the control-signal 2 has to be adapted to the relevant field output transformer 3 and the deflection coils 6 so that a sawtooth current passes through said deflection coils.

An anode resistor 7 is connected in series with the primary winding of the transformer 3. It will be explained more fully with reference to FIG. 2 that the load connected to the secondary winding 4 is adapted so that the winding 4 may be considered to form a source of sawtooth voltage. The requirements for obtaining this adaptation will be described with reference to FIG. 2. FIG. 2 shows several substitute diagrams for explaining the required adaptations of the winding 4 to operate virtually as a voltage source, which is designated hereinafter by $V_{zt}$. This adaptation has to be such that a pure parabolic voltage is produced across the resistor 7. This is represented hereinafter by the source $V_{par}$.

The derivation of the substitute diagram is based on the assumption that the deflection current $I_d$ through the deflection coil 6 is very high with respect to the convergence currents through the three convergence coils R, G and B. Therefore, the load on the winding 4 is negligible in the calculations and the voltage available at the primary winding of the transformer 3 depends solely upon the load formed by the deflection coil 6. The voltage across the winding 4 is found by taking into account the transformation ratio of the primary winding and the winding 4 of the transformer 3.

Therefore, as a first approximation, it is possible to calculate the adaptations by starting with the substitute diagrams of FIGS. 2*a* and 2*b*.

FIG. 2*a* shows solely the substitute diagram of the deflection coil 6 transposed to the primary winding of the transformer 3. $L_p$ denotes the primary inductance of the transformer 3, $L_d$ the self-induction value and $R_d$ the ohmic resistance of the coil 6, transformed to primary winding.

FIG. 2*b* shows the substitute diagram of the resistor 7, with which the resistors 14 and 15 are connected in parallel. These resistors in common are represented by the resistor $R_p$, and connected in parallel therewith is the series combination of an inductor $L_c$ and a resistor $R_c$. The inductor $L_c$ represents the overall inductance value of the coils R, G and B. $R_c$ is the overall ohmic value of the circuit forming the load of the resistors 7, 14 and 15. The displacement of the tappings *b*, *c*, *d*, *e*, *f*, *g* means that the ohmic resistor $R_c$ cannot be considered to be constant. However, if the ohmic resistance of the coils R, G and B is high with respect to the resistance of the potentiometers employed, the adaptation error involved is only slight.

Since virtually the resistor 7 is connected in series with the primary winding of the transformer 3, both the arrangement of FIG. 2*a* and that of FIG. 2*b* may be said to be energized by the anode current $I_a$ of the tube 1. This anode current comprises a sawtooth component and a parabolic component produced by the control-signal 2, which contains a sawtooth component and a parabolic component.

If the conditions:

$$\frac{R_p+R_c}{L_c}=\frac{R_d}{L_p+L_d} \qquad (1)$$

and $$\frac{R_c}{L_c}=\frac{R_d}{L_d} \qquad (2)$$

are fulfilled, a calculation proves that the deflection coil 6 will be traversed by a sawtooth current and the series combination of $L_c$ and $R_c$, in parallel with $R_p$ (FIG. 2*b*), will be traversed by a parabolic current $I_{par}$.

It is assumed above that the load $L_c$, $R_c$, which is in fact also a load on the winding 4, does not affect the waveform of the voltage so that if the winding 5 supplies the desired sawtooth voltage, the winding 4 also provides the desired voltage.

The conditions 1 and 2 are different.

The numerator of the left-hand member of Equation 1 contains $R_p+R_c$, whereas the numerator of the left-hand member of Equation 2 contains only $R_c$.

The denominator of the right-hand member of Equation 1 contains $L_p+L_d$, whereas the corresponding member of Equation 2 has only $L_d$.

This means that the two conditions cannot be fulfilled simultaneously.

According to the invention the best solution is to satisfy the condition of Equation 1.

The desired parabolic current then flows through the convergence coils, but the desired sawtooth current does not.

For passing a sawtooth current through the convergence coils, a further adaptation of the circuitry connected to the winding 4 is required. In principle, the available methods are:

(1) The method of using an LR-network and (2) The method of using an RC-network.

The first method is illustrated in FIG. 2*c*, the second in FIG. 2*d*.

In FIG. 2*c* the source 17 represents the sawtooth voltage source, providing the voltage determined by Equation 1 and produced actually by the winding 4. The matching elements added are $R'_4$, $L_s$, $R_s$ and $R_t$. Only the elements $R'_4$, $L_s$ and $R_s$ need be added, since $R_t$ is already provided in the form of several potentiometers employed in the arrangement.

The values of said three matching elements can be found from:

$$R_4'=R_t\sqrt{\frac{\frac{R_d}{L_d}}{\frac{R_c}{L_c}}-1}\cdot\sqrt{\frac{\frac{R_c}{L_c}}{\frac{R_d}{L_d}}} \quad (3)$$

$$L_s=\frac{R_t}{\frac{R_c}{L_c}\sqrt{\frac{\frac{R_d}{L_d}}{\frac{R_c}{L_c}}-1}\cdot\left\{\sqrt{\frac{\frac{R_d}{L_d}}{\frac{R_c}{L_c}}-1}+\sqrt{\frac{\frac{R_d}{L_d}}{\frac{R_c}{L_c}}}\right\}} \quad (4)$$

$$R_s=\frac{R_t}{\sqrt{\frac{\frac{R_d}{L_d}}{\frac{R_c}{L_c}}-1}\cdot\left\{\sqrt{\frac{\frac{R_d}{L_d}}{\frac{R_c}{L_c}}-1}+\sqrt{\frac{\frac{R_d}{L_d}}{\frac{R_c}{L_c}}}\right\}} \quad (5)$$

However, the first method requires much energy, since the series combination of $L_s$ and $R_s$ passes a leakage current which is lost for the series combination of $L_c$ and $R_c$, representing the convergence coils proper. Therefore, the second method is better.

In FIG. 2*d*, the source 17 represents the voltage source formed by the winding 4 with $R_4$, $C_4$ and $R_t$ added as matching elements. $R_t$ represents the overall value of the potentiometers, so that $R_4$ and $C_4$ form the matching network proper.

The values of these two elements are:

$$R_4=R_t\left(\frac{\frac{R_d}{L_d}}{\frac{R_c}{L_c}}-1\right) \quad (6)$$

$$C_4=\frac{\frac{L_c}{R_c}}{R_t\left(\frac{\frac{R_d}{L_d}}{\frac{R_c}{L_c}}-1\right)} \quad (7)$$

In this second method no current is lost, so that it is preferred.

As stated in the preamble, the use of a single voltage source for the desired sawtooth voltage is preferred over the use of two sources for this purpose as described in U.S. Patent 3,114,858. Matching is then required only once, whereas the prior art system using two sources requires double adaptation.

Because of the aforesaid energy advantage, the second method of adaptation is chosen (see FIG. 1). For this purpose the network $R_4$, $C_4$ is connected between the terminal 12 of the winding 4 and one end of the resistor 8. This network has a function differing from that of the RC-network connected between the potentiometers 7 and 14 which have the same function as the RC-network 18, 19 of FIG. 1 of the aforesaid U.S. patent.

The secondary winding 4 has connected to it a first resistor 8, a second resistor 9, a third resistor 10 and a fourth resistor 11. From FIG. 1 it is apparent that the resistors 8 and 9 are connected in parallel with each other and coupled with the output terminals 12 and 13 of the secondary winding 4.

The four resistors are provided with variable tappings *c, d, e* and *g*. The resistors 10 and 11 are connected in parallel and one junction *h* of this parallel combination is connected to the first convergence coil R, whereas the other junction *k* is connected to one end of a second convergence coil G. FIG. 1 shows that the variable tappings *e* and *d* are connected to the terminals 13 and 12 of the winding 4, respectively. The tappings *d* and *e* are mechanically coupled with each other, which is indicated by the broken line 14' of FIG. 1. This mechanical coupling is arranged so that upon a turn of the common adjusting member of the tappings *d* and *e*, said tappings move in opposite senses along the registors 10 and 11. Consequently, if tappings *d* moves towards the junction *k*, the tapping *e* moves towards the junction *h*, and conversely. The significance thereof will be explained with reference to the substitute diagrams 3, 5, 6 and 7. The remaining end of the convergence coil G is connected to the variable tapping *a* of the anode resistor 7. The other end of the convergence coil R is connected to one end of the resistor 7. Between the tapping *a* and said end of the anode resistor 7 there is connected a further resistor 14, with which a resistor 15 is connected in parallel. The resistor 14 has a variable tapping *b* which is connected to a fixed central tapping *l* of the resistor 15. The latter is furthermore connected to the variable tapping *c* of the resistor 8. The resistor 15 has a further variable tapping *f*, which is connected to a third convergence coil B. The other end of coil B is connected to the variable tapping *g* of the resistor 9.

The letters G. B and R indicate that the convergence coils concerned are intended for the dynamic convergence of the green, blue and red electron beams, respectively, of a three-gun color display tube. In the embodiment shown, these convergence coils are esepecially intended for the field correction. There may be provided three separate coils for the radial convergence in the line direction, but the same coils may serve for correction both in the field direction and in the line direction. In that case the coils G. B and R also receive sawtooth and parabolic currents having a frequency corresponding to the rhythm of the line scan.

The operation of the circuit arrangement of FIG. 1 will be explained with reference to FIGS. 3 to 9.

It will first be explained how the currents through the convergence coils R and G can be adjusted and subsequently, how this is done for the convergence coil B. In general, it is desired to adjust two electron beams in common since a separate adjustment involves much more difficulties. It is possible to cause the red and green electron beams to coincide in common, and then the blue electron beam can be made to converge with the red and green beams. A separate adjustment would be much more complicated. An arrangement for adjusting two electron beams in common is termed a matrix arrangement.

Figure 3:
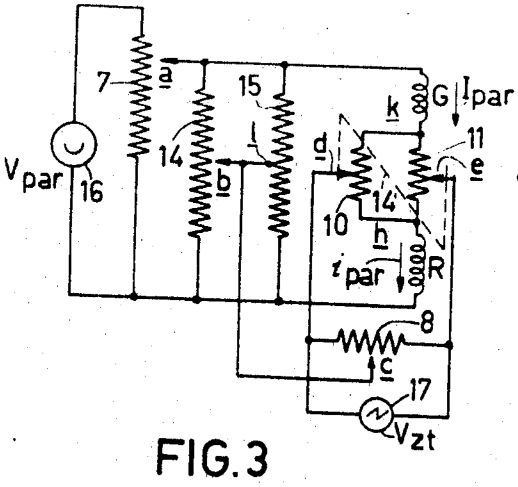
FIG. 3 shows a partial substitute diagram of the arrangement of FIG. 1 for explaining further the operation of said arrangement.
Figure 4:
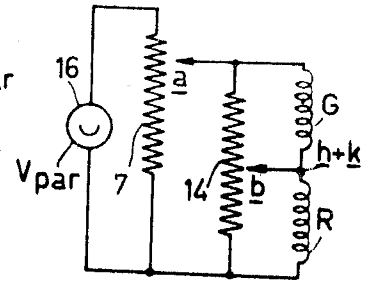
FIG. 4 shows a diagram further simplified with respect to FIG. 3.
Figure 5:
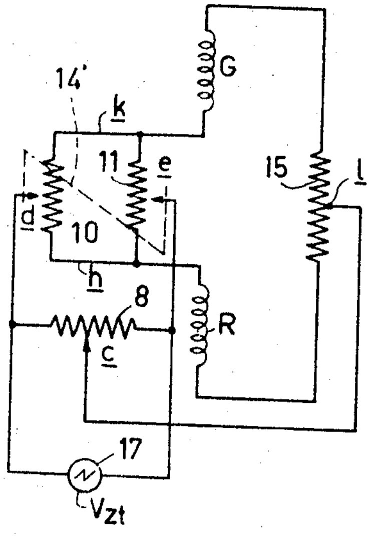
FIG. 5 shows a substitute diagram further simplified with respect to FIG. 3 for explaining the adjustment of the sawtooth current.

A matrix arrangement, according to the invention, is shown in FIG. 3. The source of parabolic voltage $V_{par}$ is represented in FIG. 3 by the source 16 and the source of sawtooth voltage $V_{zt}$ is represented by the source 17. The amplitude of the parabolic current through the coils G and R, designated in FIG. 3, by the arrows $i_{par}$, can be varied by displacing the tapping *a* of the resistor 7. However, since the extent of convergence of the coil R may differ from that of the coil G, it is necessary not only for the overall amplitude of the parabolic current to be adjustable with the aid of the variable tapping *a*, but also for the currents through the two convergence coils to be relatively variable. This can be achieved by means of the variable tapping *b* of the resistor 14. The tapping *b* is connected to the tapping *c* of the resistor 8 and the ends of the latter resistor are connected through the tappings *d* and *e* of the resistors 10 and 11 to the coils R and G. Since the resistors 8, 10 and 11 serve for the adjustment of the sawtooth current, they are unessential for the adjustment of the parabolic current. It will therefore be assumed for the sake of simplicity that the tappings *c*, *d* and *e* are all at the centers of the respective resistors, so that it can be said that the tapping *b* is connected to the ends *h* and *k* of the coils R and G, which are connected to the parallel combination of the resistors 10 and 11. In connection herewith the diagram of FIG. 3 may be replaced, as far as the adjustment of the parabolic current is concerned, by the diagram of FIG. 4. It will be seen from this figure that, when the tapping *b* is located at the junction of the resistor 14 with the tapping *a*, the coil G is short-circuited so that the parabolic current of this coil is zero, whereas that through the coil R is at a maximum. If the tapping *b* is at the other end of the resistor 14, the current through the coil R is zero and that through the coil G is a maximum. If the tapping *b* is at the center of the resistor 14, the currents through the two coils are equal. By displacing the tapping *b*, the parabolic currents through the coils R and G can thus be relatively varied at will. With respect to the errors due to said image plane, any desired convergence correction can thus be obtained by means of the displacements of the tappings *a* and *b*.

It is, however, also necessary to pass sawtooth currents through the coils R and G. These currents must either have the same directions as the parabolic currents, or be opposite to one or to both the currents. It must be possible to pass through the coils R and G a sawtooth current which has the same direction in the coils R and G, but the direction of which can be completely reversed, and it it also necessary to pass through the coils R and G sawtooth currents which have relatively opposite directions. It is furthermore required that the directions for the two coils be reversible. This can be achieved by means of the variable tappings *c*, *d* and *e*. For further explanation, FIG. 3 is simplified to FIG. 5, in which only those parts are shown which are essential for the adjustment of the sawtooth current $i_{zt}$.

Figure 6:
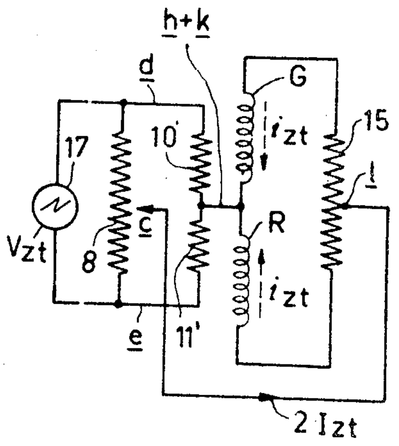
FIG. 6 shows a substitute diagram further simplified with respect to FIG. 5 for explaining the possibility of adjustment by which the sawtooth current through one convergence coil has a direction opposite that of the sawtooth current through the other convergence coil.

If it is first assumed that the tappings *d* and *e* are located at the centers of the resistors 10 and 11, they form together with the portions of the resistors 10 and 11 a bridge circuit, so that no potential difference due to the source 17 can be produced between the junctions *h* and *k*. The points *h* and *k* may thus be considered to be interconnected so that the ends of the coils R and G, connected to said ends, are connected with each other. At the same time, the equal portions of the resistor 10 on either side of the tapping *d* are thus connected in parallel with each other and they form a new resistor 10', shown in FIG. 6. Similarly, the resistor 11' of FIG. 6 is the parallel combination of the equal portions of the resistor 11 on either side of the tapping *e*. Thus the substitute diagram of FIG. 6 is obtained in which the junction of the coils R and G, i.e. the point $h+k$, is connected to the junction of the resistors 10' and 11'. The tapping *c* on the resistor 8 is connected to the tapping *l* on the resistor 15. Consequently, the parts 15, R and G form the diagonal branch of a bridge circuit formed by the resistors 10' and 11' and the portions of the resistor 8 on either side of the tapping *c*.

If the tapping *c* is positioned at the center of the resistor 8, the bridge is in a state of equilibrium so that no sawtooth current passes through the diagonal branch. This means that the sawtooth current through the coils R and G is zero. When the tapping *c* is displaced towards the tapping *d*, a sawtooth current $i_{zt}$ will flow, for example, the current $2i_{zt}$, indicated by the arrow, which splits up from the tapping *l* into two equal currents $i_{zt}$, which is indicated by the broken arrows in FIG. 6. FIG. 6 shows that these currents flow in the coils R and G in opposite directions since they both flow towards the junction $h+k$. It is assumed that the direction indicated in FIG. 6 is associated with a displacement of the tapping *c* towards the tapping *d*. When the tapping *c* is displaced from the center towards the tapping *e*, the direction of the sawtooth current $i_{zt}$ through the two coils is reversed. By displacing the tapping *c*, any desired amplitude of the sawtooth currents through the coils R and G can thus be adjusted. The amplitudes of the currents through the two coils are equal and can be increased or decreased equally by the displacement of the tapping *c*.

Figure 7:
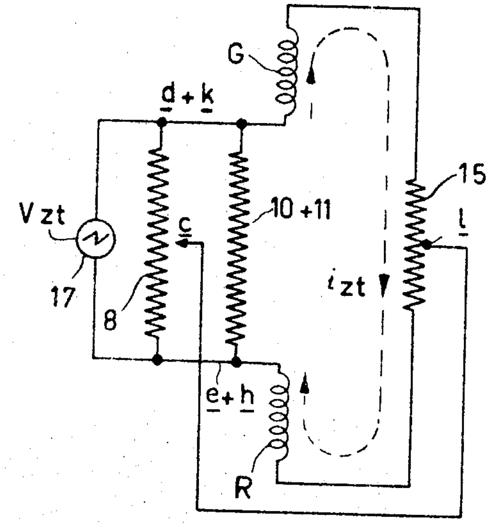
FIG. 7 shows a substitute diagram further simplified with respect to FIG. 5 for explaining how the sawtooth current can flow in the same direction through the two convergence coils with a given sense of winding.

As stated above, it is furthermore necessary for the sawtooth currents through the coils R and G to flow in the same direction and to have different amplitudes. This is achieved by the displacement of the tappings *d* and *e*. If it is assumed that the tapping *c* is at the center of the resistor 8, the sawtooth component through the coils R and G having the opposite sense, is zero. When the tappings *d* and *e* are displaced so that the tapping *d* coincides with the junction *k* and the tapping *e* with the junction *h*, the substitute diagram of FIG. 7 is obtained. Since the tapping *c* is supposed to be at the center of the resistor 8, no current will pass through the conductor between the tappings *c* and *l*. Therefore, the source 17 is, so to say, in series with the coils R and G so that a sawtooth current $i_{zt}$ will flow, as is indicated by the arrow points on the broken line of FIG. 7. However, if the tappings *d* and *e* are displaced in the opposite direction, *d* coincides with *h* and *e* with *k* which means that the current $i_{zt}$ reverses its direction.

Consequently, the current $i'_{zt}$, having the same direction in the coils R and G, will be zero when the tappings *d* and *e* are at the centers of the resistors 10 and 11. The current will be a maximum and have a direction as indicated in FIG. 7 when the tappings *d* and *e* are displaced to the junctions *k* and *h*, respectively, and will be a maximum in the opposite direction when *d* coincides with *h* and *e* with *k*. Therefore, by displacing the tappings *e* and *d*, any desired value of the current $i'_{zt}$ can be adjusted.

A comparison of FIGS. 6 and 7 shows that the current $i_{zt}$ through the coil R in FIG. 6 has the same direction as the current $i'_{zt}$ through the coil R in FIG. 7. The currents passing through the coil G, however, will have opposite directions. The current through R will thus be increased and that through G will be decreased. The desired difference is thus obtained. If, on the contrary, the current $i'_{zt}$ has reversed its direction and the currents $i_{zt}$ have not changed their directions, the current through the coil G is increased with respect to that through the coil R. It will be obvious that by a proper displacement of the tappings *c*, *d* and *e*, any desired value and any desired direction of the currents through the coils R and G can be adjusted. The relative variations of the currents thus obtained is desired, since the red and green electron beams have to be displaced equally.

It should be noted that the resistor 15 is not required for adjustment of the sawtooth component, since it is only necessary for the tapping *c* to be connected to the ends of the coils R and G remote from the junctions *k* and *h*. However, in the absence of the resistor 15, the parabolic voltage $V_{par}$ would be short-circuited so that no parabolic current could flow through the coils R and G. The resistor 15 is therefore necessary. Moreover, according to a further aspect of the invention, it is now possible to utilize the resistor 15 twice by providing it with a variable tapping $f$, which is connected to one end of the blue convergence coil B.

As stated above it may be necessary, subsequent to the adjustment of the convergence for the red and green electron beams, to adjust a parabolic current capable of traversing the coil B in both directions. Moreover, there remains the requirement that a sawtooth current should be able to traverse the coil B in both directions. This is possible by including the coil B in the matrix circuit illustrated in FIG. 1. All of the aforesaid adjustment is obtained by providing the additional variable tapping $f$ and the potentiometer 9 with the variable tapping $g$. It will now be explained with reference to FIGS. 8 and 9 how the currents through the coil B are adjusted. For the sake of simplicity, the parts (with the exception of the potentiometer 8) relating solely to the adjustment of the currents through the coils R and G are omitted from FIG. 8.

Figure 8:
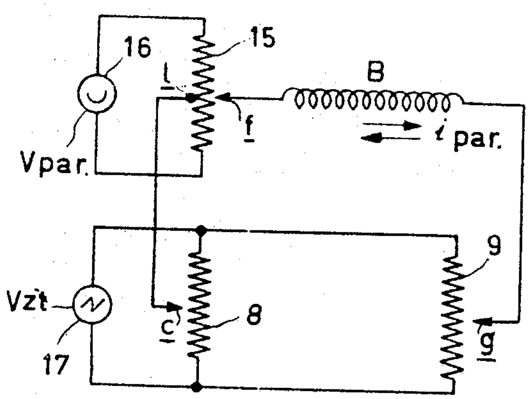
FIG. 8 shows a substitute diagram simplified with respect to FIG. 1 for explaining the adjustment of the third convergence coil.

FIG. 8 shows that, when the tapping $f$ is just opposite the tapping $l$, no parabolic current $i_{par}$ passes through the coil B. If the tapping $f$ is displaced from $l$ to one side, the current $i_{par}$ flows in one direction and, if the tapping $f$ is displaced to the other side of $l$, the direction of $i_{par}$ is reversed, which is indicated by the full arrows of FIG. 8. It is thus possible to adjust any desired amplitude and direction of the current $i_{par}$ by means of the tapping $f$.

Figure 9:
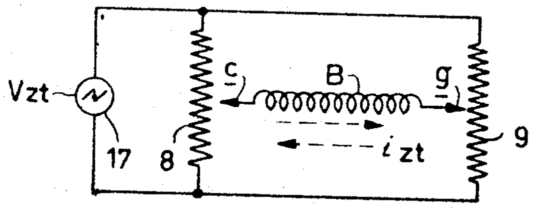
FIG. 9 shows a substitute diagram further simplified with respect to FIG. 8 for explaining the adjustment of the sawtooth current through the convergence coil for the third electron beam.

The mode of adjustment of the sawtooth current $i_{zt}$ through the coil B will be explained with reference to FIG. 9. In this figure the source 16 is omitted and it is assumed that the tapping $f$ is just opposite the tapping $l$, so that the end of the coil B, connected to the tapping $f$ may be considered to be connected to the tapping $c$. The tapping $c$ is, as stated above, required for the adjustment of the sawtooth current through the coils R and G (see FIG. 6), so that a sawtooth current would flow through the coil B without this being desired. By displacing the tapping $g$ of the resistor 9, a bridge can be formed for any position of $c$ so that the sawtooth current $i_{zt}$ through the coil B will be zero. By displacing the tapping $g$ to one side or to the other with respect to said point of equilibrium, a current $i_{zt}$ can be adjusted through the coil B in one direction or in the other. The amplitude of this current depends upon the displacement of $g$. Like with the coils R and G, any desired combination of parabolic and sawtooth currents may be adjusted for the coil B. With this mode of connections according to the invention, without the need for further means, any desired sawtooth current can be adjusted by using only one source 17 for supplying the sawtooth voltage $V_{zt}$.

Although in the foregoing the parabolic voltage $V_{par}$ is obtained from the anode resistor 17, it may also be obtained from the cathode resistor 18, which need not be smoothed to the same extent as is done with the aid of the electrolytic capacitor 19 of FIG. 1.

The cathode resistor 18 will also be traversed by the same current as the resistor 7. The resistor 14 with the associated parts may therefore also be connected to the resistor 18 as it is connected to the resistor 7. It should only be considered that the polarity of the voltage across the resistor 18 is opposite that of the resistor 7. Therefore, the coils R and G have to be exchanged or their connections have to be inverted. In this case the same direction of the parabolic current is obtained as in the embodiment shown in FIG. 1. It will be obvious that the tube 1 may be replaced by a transistor, which is controlled in the same way as the tube 1, so that the collector current comprises a sawtooth component and a parabolic component.

What is claimed is:

1. A television circuit for providing dynamic, radial convergence of at least two electron beams in a display tube at the field frequency of the television system comprising, at least two convergence coils adapted to be disposed adjacent the display tube to develop respective fields for adjusting said two electron beams, a first source of parabolic current, means for varying said parabolic current in common through the two convergence coils, a second source of sawtooth current, means for varying said sawtooth current through the two convergence coils in common comprising, two parallel-connected resistors each having a variable tapping mechanically coupled with each other so that adjustment thereof causes the tappings to move in relatively opposite senses along the relevant resistors, a third resistor having a variable tapping, means connecting said third resistor between the tappings of said two parallel-connected resistors and in parallel with the sawtooth current source, means connecting the first convergence coil, the parallel-connected resistors and the second convergence coil in series in said order of succession, a fourth resistor, means interconnecting the other ends of the coils with the interposition of said fourth resistor, means connecting the variable tapping of the third resistor to a fixed tapping of the fourth resistor, and means for applying the variable parabolic voltage to said fourth resistor.

2. A circuit as claimed in claim 1, in which the first source is a voltage source capable of providing the amplitude-varied parabolic voltage to be varied in amplitude and further comprising a third convergence coil adapted to be disposed adjacent the display tube to develop a field for adjusting a third electron beam of the display tube, a fifth resistor connected in parallel with the fourth resistor, the fixed tapping of said fourth resistor being a center tap, said fifth resistor having a variable tapping connected to the central tapping of the fourth resistor, means connecting the fourth and the fifth resistor in parallel with the first source supplying the parabolic voltage, means connecting one end of the third coil to a variable tapping of the fourth resistor, means connecting the other end of the third coil to a variable tapping of a sixth resistor, and means connecting the sixth resistor in parallel with the third resistor.

3. A circuit as claimed in claim 1 further comprising a fifth resistor having a variable tapping, means connecting said fifth resistor to said parabolic current varying means, and means for coupling the tapping of said fifth resistor to a junction point in the circuit between said two convergence coils thereby to relatively adjust the parabolic currents flowing therein.

4. Dynamic convergence apparatus for a tricolor television cathode ray tube comprising, first and second convergence coils adapted to be disposed adjacent the cathode ray tube to develop first and second convergence fields for adjusting first and second electron beams, respectively, of said tube, means connecting said coils together for simultaneous control, a first source of periodic energy at the vertical deflection frequency coupled to said coils to cause a parabolic current to flow therein, said energy source including means for adjusting said parabolic current in common through the two coils, two parallel-connected potentiometers having their respective contact arms mechanically coupled together so as to move in opposite senses, a third potentiometer connected between the contact arms of said two parallel-connected potentiometers, a first resistor having a tap, means connecting the first coil, the two parallel-connected potentiometers, the second coil and the first resistor in series circuit, means connecting the contact arm of said third potentiometer to the tap of said first resistor, and a second source of periodic energy at the vertical deflection frequency coupled to said third potentiometer to cause a sawtooth current to flow in said two convergence coils.

5. Apparatus as described in claim 4 further comprising a fourth potentiometer connected in parallel with said first resistor, means connecting said parallel combination across said first energy source, and means connecting the contact arm of said fourth potentiometer to the tap of said first resistor whereby the relative amplitudes of the parabolic currents in said two coils can be varied.

6. The apparatus as described in claim 5 wherein said first resistor further includes a variable tap, said apparatus further comprising a third convergence coil adapted to be disposed adjacent the cathode ray tube to develop a third convergence field for adjusting a third electron of said tube, a fifth potentiometer connected in parallel with said third potentiometer, and means connecting said third coil between the variable tap of said first resistor and the contact arm of said fifth potentiometer so that said first and second energy sources cause a parabolic current and a sawtooth current to flow therein.

7. Dynamic convergence apparatus for a tricolor television cathode ray tube comprising, a field output amplifier, a transformer having a primary winding and a secondary winding, a resistor having a variable tape, means connecting said resistor, said primary winding and said amplifier in series across a source of voltage, means for applying a control signal to the control electrode of said amplifier, first, second and third convergence coils, first and second parallel-connected potentiometers having their respective contact arms mechanically coupled together so as to move in opposite senses, a third potentiometer connected between the contact arms of said two parallel-connected potentiometers, fourth and fifth potentiometers connected in parallel to the variable tap on said resistor, means serially connecting the first coil, the first and second parallel-connected potentiometers, and the second coil across the fourth and fifth parallel-connected potentiometers, means connecting the contact arms of said third and fifth potentiometers together to a center tap of said fourth potentiometer thereby to provide a current path for the flow of a parabolic current via the variable tap of said resistor through said first and second coils, a sixth potentiometer connected in parallel with said third potentiometer, means connecting said third coil between the contact arms of said fourth and sixth potentiometers, and means connecting said secondary winding across the parallel combination of said third and sixth potentiometers thereby to provide a sawtooth current for said first, second and third convergence coils.

8. Dynamic convergence apparatus for adjusting an electron beam of a tricolor television cathode ray tube comprising, a convergence coil adapted to be disposed adjacent the cathode ray tube to develop a convergence field for said electron beam, a resistor having a tap, a first potentiometer connected in parallel with said resistor, a second potentiometer having a tap, means connecting said coil between the contact arms of said first and second potentiometers, means connecting the tap on said resistor to the tap on said second potentiometer, a first source of periodic energy connected across said second potentiometer to cause a parabolic current to flow in said coil whose amplitude and direction are controlled by the contact arm of said second potentionmeter, and a second source if periodic energy connected across the parallel combination of said first potentiameter and said resistor to cause a sawtooth current to flow in said coil and whose amplitude and direction are controlled by the contact arm of said first potentiometer.

References Cited

UNITED STATES PATENTS

| | | | |
|---|---|---|---|
| 2,987,647 | 6/1961 | Armstrong | 315—13 |
| 3,114,858 | 12/1963 | Schopp | 315—13 X |

RODNEY D. BENNETT, Jr., *Primary Examiner.*

MALCOLM F. HUBLER, *Assistant Examiner.*